Sept. 11, 1962 F. A. LITZ 3,053,450

PHOTOELECTRIC DIGITAL ADDER CIRCUIT

Filed Dec. 2, 1958

INVENTOR.
FRANK A. LITZ

BY Robert H. Fraser

ATTORNEY

United States Patent Office 3,053,450
Patented Sept. 11, 1962

3,053,450

PHOTOELECTRIC DIGITAL ADDER CIRCUIT

Frank A. Litz, San Jose, Calif., assignor to International Business Machines Corporation, New York, N.Y., a corporation of New York Filed Dec. 2, 1958, Ser. No. 777,765
10 Claims. (Cl. 235—172)

Figure 1:
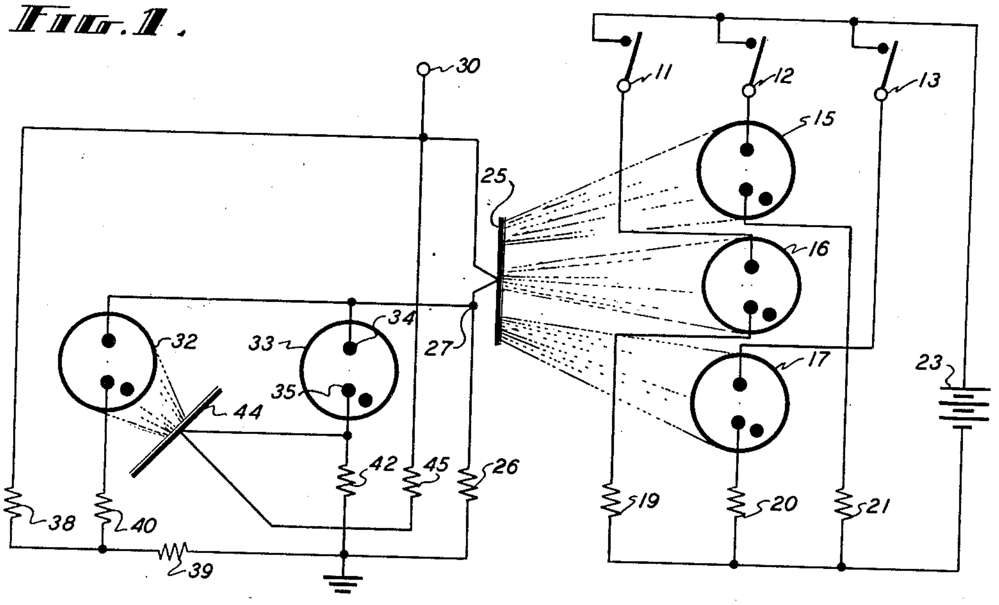

This invention relates to electrical circuits for performing an addition of binary values and more particularly to a new and improved adder circuit utilizing luminescent photoelectric elements as operating components.

In digital computer and data processing systems it is well known to perform computations and manipulations of numerical data by means of binary coded electrical signals. One particular function which is frequently performed in digital computation systems operating in conjunction with binary coded signals is often referred to as a full addition operation. The operation consists of adding three separate binary coded input signals to produce binary coded output signals in the form of a sum signal, a carry signal, or combined sum and carry signals. Full adder circuits usually have two signal inputs for receiving electrical signals in binary code and an additional carry input circuit for receiving an electrical signal indicating a carry from a preceding circuit.

In response to the aforesaid input and carry signals, a full adder circuit provides output signals which represent the sum of the binary values represented by the input and carry signals. Thus, where a "0" corresponds to one binary value and "1" corresponds to the other binary value, and where A, B and C correspond to input signals applied to a full adder circuit, the following table sets forth the resultant value of the output signals in which S represents a sum output signal and $C_o$ represents a carry output signal.

| A | B | C | S | $C_o$ |
|---|---|---|---|---|
| 0 | 0 | 1 | 1 | 0 |
| 0 | 1 | 0 | 1 | 0 |
| 1 | 0 | 0 | 1 | 0 |
| 0 | 1 | 1 | 0 | 1 |
| 1 | 0 | 1 | 0 | 1 |
| 1 | 1 | 0 | 0 | 1 |
| 1 | 1 | 1 | 1 | 1 |

From the above table it may be seen that a full adder circuit provides a sum output signal having a "1" value alone in response to a single input signal having a "1" value, a carry output signal having a "1" value alone in response to two concurrent input signals having values equal to one, and both sum and carry output signals having values equal to one in response to three concurrent input signals having values equal to one.

The half adder operation by way of contrast performs an addition of two binary coded input signals and does not take into account a carry from a preceding circuit. Where a complex binary addition is to be performed requiring a number of interconnected adder circuits, a half adder circuit may be employed as a first stage since no carry operation is required, and full adder circuits may be employed for subsequent stages to take into account any required carry operations.

Although many types of electrical circuits for accomplishing a full addition operation are known, an area of increasing interest is that in which radiant energy transducers are used as operational components, as for example, gaseous and electroluminescent light sources, and photoconductors. A principal virtue of such transducers is economy of operation and high reliability.

Therefore, it is a principal object of the present invention to provide a simple full adder circuit utilizing radiant energy transducers having a high degree of reliability.

It is another object of the present invention to provide an improved photoelectric full adder circuit capable of producing unambiguous output signals representing an addition of binary coded input signals.

Yet another object of this invention is to provide a full binary adder circuit which is inexpensive, small in size, which operates with a high degree of reliability despite normal variations in power supply, and which requires little operating power.

Briefly, in accordance with one aspect of the invention, a number of radiant energy emissive input devices are arranged to be individually energized to represent binary coded input signals. A photoelectric element is connected in series with a fixed resistor and a potential source to receive radiant energy from the input devices so as to vary the voltage appearing across the fixed resistor in a manner which produces an analog summation representing the number of energized input devices. In a particular arrangement of the invention utilizing three separate input devices, the analog summation potential may have any one of three discrete levels corresponding to the number of energized input devices. Separate sum and carry output devices are coupled to the fixed resistor to receive the analog summation potential so that the sum and carry output devices are energized representing the sum of the binary values represented by the input devices. By means of a back-biasing circuit utilizing a photoelectric element responsive to energization of the carry output device, the potential appearing across the sum output device is controlled so that at an intermediate level of the analog summation potential the sum output device is not energized. Accordingly, for a first level of analog summation potential the sum output device alone is energized, for an intermediate level of the analog summation potential the sum and carry output devices are energized but energization of the carry device results in back-biasing the sum device off and leaving the carry device only on, and for a third higher level of the analog summation potential both the carry and sum output devices are energized again, but in this condition the analog summation potential is sufficiently high to overcome the back bias on the sum device and both are switched on.

Figure 2:
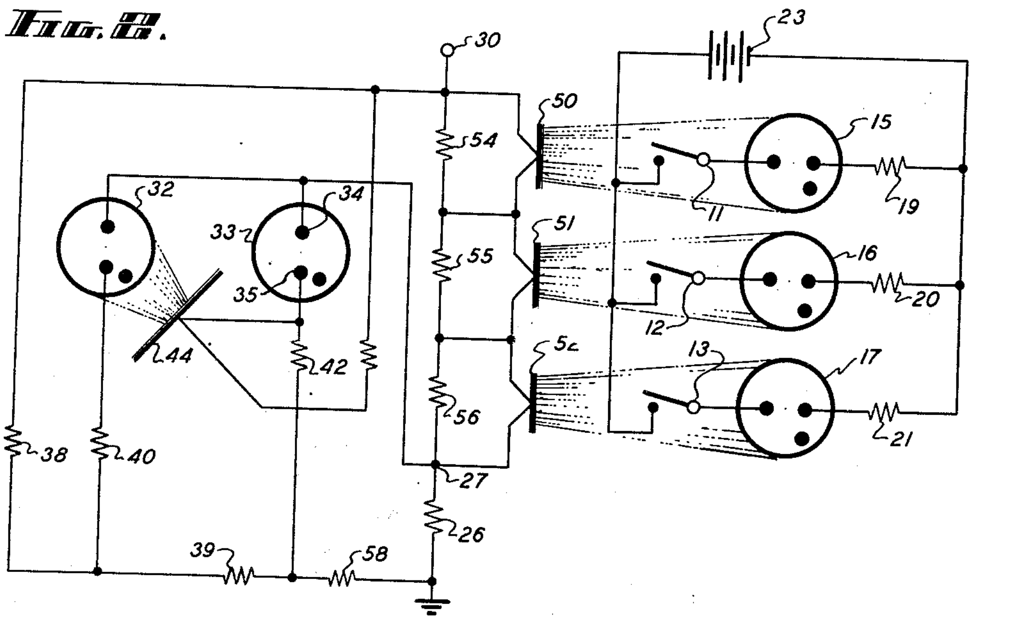

A better understanding of the invention may be had from a reading of the following detailed description and an inspection of the drawings, in which like reference numerals refer to like parts, and in which:

FIG. 1 is a schematic circuit diagram of a full adder circuit in accordance with the invention; and FIG. 2 is a schematic circuit diagram of an alternative arrangement of a full adder circuit in accordance with the invention.

The arrangement of FIG. 1 is adapted to perform an addition function in response to three binary coded input signals. As illustrated in FIG. 1, the alternate conditions of operation of three different single-pole singlethrow switches 11, 12 and 13 represent alternate binary values. When closed, the switches 11, 12 or 13 provide completed circuits via the resistors 19, 20 and 21 from a potential source 23 for individually energizing a plurality of input devices 15, 16 and 17 which are adapted to emit radiant energy when activated. Thus, the input devices represent one binary value when energized, and the other binary value when not energized. For example, the input devices 15, 16 and 17 may each comprise a light emissive gas filled ionizable tube such as a conventional neon tube. The input devices 15, 16 and 17 should have substantially like characteristics and may be energized from any suitable input signal source with the switches 11, 12 and 13 being exemplary of one simple input circuit arrangement. Other forms of input devices may be used, particularly solid state electroluminescent devices. In practice, the input elements will usually be elements in an arithmetic unit or output indicators of a preceding stage in a binary counter.

The radiant energy from the input devices 15, 16 and 17 is received by a photoelectric or photoconductive element 25, such as, for example, a cell of cadmium selenide or other material which is conductive in the presence of the radiant energy emitted by the input devices 15, 16 and 17. The input devices 15, 16 and 17 may therefore be considered to be optically coupled to the photosensitive element 25. If desired, conventional optical focusing arrangements may be interposed between the input devices 15–17 and the photoconductive element 25 to direct the radiant energy to a selected location on the surface of the element 25. The photoconductive element 25 provides a variable resistance in accordance with the intensity of the incident radiant energy so that as the radiant energy striking the device increases, the conductivity of the device increases with a consequent reduction in resistance to the flow of current.

As illustrated in FIG. 1, each of the input devices 15, 16 or 17 may be positioned so that the amount of light which is incident on the photoconductive element 25 from each of the input devices 15, 16 and 17 is relatively equal. The photoconductive element 25 may be shielded from ambient light by a suitable enclosure (not shown) which does not interfere with the passage of radiant energy from the input devices 15, 16 and 17.

A voltage divider is provided by a resistor 26 in series with the first photoconductive element 25. The junction point between the photoconductive element 25 and the resistor 26 constitutes a terminal 27 at which a voltage appears corresponding to a summation of the binary values represented by the condition of energization of the input devices 15, 16 and 17. The voltage divider may be connected across a source of positive potential applied to a terminal 30 with the lower end of the divider being connected to ground.

An output circuit is coupled across the resistor 26 to receive analog summation signals and to provide binary sum and carry signals as a result of a full addition process. The output circuit includes a carry signal output device 32 and a sum signal output device 33, each having one electrode coupled to the analog summation terminal 27. The output devices 32 and 33 may each comprise a light source similar to that employed for the input devices 15, 16 and 17. Preferably, the output devices 32 and 33 may comprise ionizable gas filled tubes having a predetermined firing potential at which the tube becomes actuated to emit light, as for example, conventional neon bulbs. Thus, one electrode 34 of the sum output device 33 is connected to the analog summation terminal 27 and the other electrode 35 is connected to a back-biasing circuit described below.

The carry output device 32 is biased so as to be capable of being fired at a predetermined threshold by the use of a pair of series-connected voltage divider resistors 38 and 39 having a junction point which is connected through a current limiting resistor 40 to the carry output device 32. The values of the series-connected voltage divider resistors 38 and 39 are selected so as to establish a desired bias level at which the carry output device 32 may be appropriately energized by the analog summation voltage from the terminal 27.

The lower electrode 35 of the sum output device 33 is connected to ground via a current limiting resistor 42 as well as to the back-biasing circuit including a second photoconductive element 44. A resistor 45 is connected between the photoconductive element 44 and the positive potential terminal 30. As shown in FIG. 1, the photoconductive element 44 is positioned to receive radiant energy from the carry output device 32. Thus, the second photoconductive element 44 is electrically coupled to the sum output device 33, but optically coupled to the carry output device 32.

In operation, the arrangement of FIG. 1 provides full binary addition of three binary input signals which may be provided concurrently and in any pattern desired by selective operation of the switches 11, 12 or 13. Closure of one or more of the switches 11, 12 or 13 provides a complete circuit to apply a potential from the source of potential 23 across the associated one or ones of the input devices 15, 16 or 17. As a consequence, devices 15, 16 or 17 may be energized to provide radiant energy coincident upon the first photoconductive element 25.

The relatively equal contributions of radiant energy from the three input devices 15–17 are utilized to establish first, second or third successively higher levels of potential in the analog summation circuit at the terminal 27. When any one, but no more than one, of the input devices 15–17 is energized, the terminal 27 is established at the first level of operation. When any two of the input devices 15–17 are energized, the second, intermediate level is established. The energization of all three input devices 15–17 produces a third and highest potential level at the analog summation terminal.

The greater the radiant energy falling on the photoconductive element 25, the less the resistance of that element and consequently the higher the potential at the analog summation terminal 27. Because of the relatively equal contributions of the individual input devices 15–17, and due to the substantial linearity of operation of the photoconductive element 25, each potential level corresponds to the number of energized input devices so that there is effectively provided an analog summation of the input signals. Thus, no matter what the combination of input signals, the corresponding level at the analog summation terminal 27 indicates the total number of input devices energized.

The output circuit cooperates with the input circuit and the analog summation circuit to provide binary coded output signals representing an addition of the input signals. For this purpose, the carry output device 32 and the sum output device 33 are set initially to be fired at different levels of potential of the analog summation terminal 27. Specifically, the sum output device 33 is biased on its electrode 35 to a lower potential than is the corresponding electrode of the carry output device 32. By proper selection of the current limiting resistor 42 with respect to the potential provided by the source of potential connected to the terminal 30, and with respect to the decrease in resistance of the first photoconductive element 25, the sum output tube 33 is fired at the first summation potential level when any one of the input devices is energized.

The bias applied to the carry output device 32 through the voltage divider resistors 38, 39 is selected so that the second summation potential level must be achieved to fire the carry output device 32. Thus, the potential at terminal 27 which is needed to fire the carry output device 32 can be sufficiently high to avoid substantially all danger of the carry output device 32 firing when only one of the input devices 15–17 is energized. As a consequence, it may be seen that the carry output device 32 will be energized only at a level safely beyond the range needed to energize the sum output device 33 alone, which is reached only when two or more input devices are concurrently energized.

In terms of Boolean algebra, the logical equation which is satisfied when the sum output device 33 alone is energized is as follows:

$$A\cdot\overline{B}\cdot\overline{C}+\overline{A}\cdot B\cdot\overline{C}+\overline{A}\cdot\overline{B}\cdot C=S\cdot\overline{C}_0 \qquad (1)$$

where A, B and C represent three separate input signals, S represents the sum and $C_0$ represents the carry, and the horizontal bar, e.g. $\overline{A}$, designates a binary value equal to "0."

When any two input devices are energized, the logical equation to be satisfied is as follows:

$$A\cdot B\cdot\overline{C}+A\cdot\overline{B}\cdot C+\overline{A}\cdot B\cdot C=\overline{S}\cdot C_0 \qquad (2)$$

The result indicated by the logical Equation 2 is accomplished by the use of the photoconductive element 44 together with the back-biasing circuit previously mentioned. When the carry output device 32 is energized, the radiant energy emitted decreases the resistance of the back-bias circuit consisting of the second photoconductive element 44 and the associated series resistor 45. Consequently, the potential at the electrode 35 of the sum output device 33 rises toward the level of the source of potential applied to the terminal 30. The rise in potential is sufficient, through selection of the value of the fixed resistor 45 with respect to the value of the potential applied to the terminal 30 and to the amount of radiant energy emitted by the carry output device 32 to de-energize the sum output device 33. The potential at the electrode 35 of the sum output device 33 is raised to a level at which the voltage between the electrodes 34 and 35 is insufficient to activate the sum output device 33. The result is that the sum output device 33 is de-energized and remains unfired at the steady state intermediate potential level from the analog summation terminal 27.

A function of the output circuit is to energize both the sum output device 33 and the carry output device 32 in response to all three input devices 15–17 being energized. With all three input devices 15–17 energized, the radiant energy striking the first photoconductive element 25 produces a decrease in the resistance of that element to a point at which the potential of the analog summation terminal 27 is permitted to rise to a level which is sufficient to fire both the sum output device 33 and the carry output device 32. Since the voltage applied to the electrode 35 via the back-biasing circuit is limited, due to the illumination provided by the carry output device 32, the back-biasing circuit is effective to de-energize the sum output device 33 only at the second level of operation, and when the potential at the terminal 27 reaches a higher level, indicative of all three inputs being concurrently present, both the sum output device 33 and the carry output device 32 become energized. The corresponding logical equation is as follows:

$$A\cdot B\cdot C=S\cdot C_0 \qquad (3)$$

The back-biasing circuit described above enables a simple adder circuit to be constructed in which digital output signals may be derived from the analog summation potential with a high degree of reliability. The cancelling or compensating effect of the back-biasing circuit in the carry only condition operates to insure that the sum output device 33 is de-energized. As a consequence, the intermediate condition of operation, which would ordinarily be most delicate with an analog arrangement, is rendered clearly distinguishable from the sum only and the combined sum and carry conditions of operation.

In one workable embodiment of the invention, the voltage values ($V_1$) at the analog summation terminal, taken with respect to ground were as follows for various combinations of input signals (A, B and C) with the resultant output signals (S and $C_0$) being given in binary code:

| A | B | C | $V_1$, volts | S | $C_0$ |
|---|---|---|---|---|---|
| 0 | 0 | 0 | 10 | 0 | 0 |
| 0 | 0 | 1 | 79 | 1 | 0 |
| 0 | 1 | 0 | 80 | 1 | 0 |
| 1 | 0 | 0 | 78.5 | 1 | 0 |
| 0 | 1 | 1 | 114.5 | 0 | 1 |
| 1 | 0 | 1 | 114 | 0 | 1 |
| 1 | 1 | 0 | 114.5 | 0 | 1 |
| 1 | 1 | 1 | 134.5 | 1 | 1 |

From the above table it is clear that each of the conditions of operation is clearly distinguishable from the others. It has been found that the circuit operates stably with variations up to 10% in the value of the potential applied to the terminal 30.

This arrangement may also be thought of as an analog to digital conversion system, the analog signal being that provided by the analog summation circuit. The arrangement of the back-biasing circuit, so that it is optically coupled to one luminescent output device but electrically coupled to the other, contributes greatly to the unique digital output states. Whether gaseous or solid state luminescent devices are used, this conversion to radiant output indications is reliably performed. Note that a chain of such adder devices, connected with suitable carry circuits, can operate as a counter without the need for amplification or gating circuitry.

An alternative arrangement of the invention is illustrated in FIG. 2 in which an analog summation circuit differing from the circuit of FIG. 1 is employed. In FIG. 2, three series-connected photoconductive elements 50, 51 and 52 are arranged to receive radiant energy individually from three input devices 15–17. Suitable shields (not shown) may be positioned between the photoconductive elements so that the photoconductive elements 50, 51 or 52 each receive energy from a single input device. In addition, each of the photoconductive elements 50–52 may be shielded from ambient light and optical focusing arrangements may be included to concentrate the radiant energy from the input devices 15–17.

In the arrangement of FIG. 2, the photoconductive elements 50–52 form a voltage divider with an associated series resistor with the analog summation terminal 27 being coupled at the junction point between the photoconductive elements 50–52 and the load resistor 26. In addition, the circuit of FIG. 2 includes three shunt resistors 54, 55 and 56 connected in parallel with the photoconductive elements 50–52, respectively. The shunt resistors 54–56 are connected in series with each other and with the load resistor 26 and operate to standardize the dark (non-illuminated) resistance values of the separate associated photoconductive elements 50–52.

Variations in the operating characteristics of the different components in this arrangement may necessitate the use of separate resistors for adjustment of voltage levels, such as the resistor 58. The resistor 58 functions to provide slightly higher potentials in the quiescent state on the electrodes of the output sum and output carry devices 33 and 32, respectively.

The arrangement of FIG. 2 operates substantially as described above in connection with FIG. 1 to provide a full addition of digital input signals. When any one of the input devices 15–17 is energized, the associated photoconductive element 50, 51 or 52 undergoes a corresponding decrease in resistance which causes an increase in the potential level at the analog summation terminal 27. Because of the setting of the dark resistance values, and with the photoconductive elements 50–52 being selected to be relatively equal in response to equal amounts of light from the input devices 15–17, the contribution of each of the photoconductive elements 50–52 to the change in the analog summation potential is approximately equal. Therefore, as in the arrangement of FIG. 1, the greater the number of input devices energized, the higher the level of the analog summation potential at the terminal 27. The output circuit, including the back-biasing arrangement, operates to provide digital outputs which represent the full addition function as described above in connection with FIG. 1.

Although two alternative arrangements of adder circuits have been illustrated in FIGS. 1 and 2 and described in detail above, it is intended that these be by way of example only. Accordingly, any and all variations, modifications or equivalents falling within the scope of the annexed claims should be considered to be a part of the invention.

What is claimed is:

1. A binary adder including the combination of an input circuit adapted to receive binary coded signals, an analog summation circuit coupled to the input circuit but electrically isolated therefrom for generating at least three discrete voltage levels corresponding to the number of coincident binary coded signals applied to the input circuit of like value, a binary sum indicating output device coupled to the analog summation circuit for registering a first analog summation voltage level, a carry indicating output device coupled to the analog summation circuit for registering a second intermediate analog summation voltage level, a back-biasing circuit including a photoelectric element optically coupled to the carry indicating output device and electrically coupled to the sum indicating output device for disabling the sum indicating output device in response to the registration by the carry indicating device of the second intermediate analog summation voltage level, and both the sum indicating output device and the carry indicating output device being adapted to register simultaneously a third analog summation voltage level whereby the registrations of the sum and carry indicating output devices represent the sum of the signals applied to the input circuit in binary code.

2. A full adder including the combination of an input circuit for receiving at least three binary coded input signals, an analog summation circuit including a photoelectric element optically coupled to the input circuit but electrically isolated therefrom for generating a voltage having at least three discrete levels corresponding to the number of coincident binary signals applied to the input circuit of like value, a sum indicating output device connected directly to the analog summation circuit for indicating a sum in response to a first one of said discrete analog summation voltage levels, a carry indicating output device also connected directly to the analog summation circuit in common connection with the sum indicating output device for indicating a carry in response to an intermediate one of said discrete analog summation voltage levels, both said sum indicating output device and said carry indicating output device being arranged to indicate a sum and a carry in response to a third one of said discrete analog summation voltage levels, and a back-biasing circuit coupled between the carry indicating output device and the sum indicating output device for disabling the sum indicating output device in response to the intermediate discrete analog summation voltage level.

3. A full binary adder in accordance with claim 2 in which the carry indicating output device comprises a radiant energy emissive element and the back-biasing circuit includes a photoelectric element positioned to receive radiant energy from the carry indicating output device and coupled to the sum indicating output device for disabling the sum indicating output device at the intermediate summation voltage level.

4. A photoelectric adder including the combination of a plurality of radiant energy emissive input devices for registering binary coded signals, an analog summation circuit coupled only optically to the input devices for generating an analog summation voltage having at least three discrete levels corresponding to the number of energized input devices, a sum indicating output device coupled to the analog summation circuit for registering discrete levels of the analog summation voltage corresponding to the binary addition of the input signals applied to the input devices, and a carry indicating output device coupled to the analog summation circuit for registering a carry in response to discrete levels of the analog summation voltage corresponding to the binary coded signals applied to the input devices, said sum and carry indicating output devices comprising radiant energy emissive devices.

5. A photoelectric adder including the combination of a plurality of radiant energy emissive input devices for registering binary coded signals, an analog summation circuit coupled only optically to the input devices for generating an analog summation voltage having at least three discrete levels corresponding to the number of energized input devices, a sum indicating output device coupled to the analog summation circuit for registering a first discrete analog summation voltage level, a radiant energy emissive carry indicating output device coupled to the analog summation circuit for registering an intermediate discrete analog summation voltage level, a photoelectric element positioned to receive radiant energy from the carry indicating output device, a back-biasing circuit connected between the photoelectric element and the sum indicating output device for disabling the sum indicating output device at the intermediate analog summation voltage level, said back-biasing circuit being arranged so that the sum and carry indications are provided by the sum and carry indicating output devices in response to a third discrete analog summation voltage level.

6. A photoelectric adder including the combination of an input circuit including at least three distinct sources of radiant energy representing binary coded signals, an analog summation circut coupled only optically to the input devices, said analog summation circuit including at least one photoconductive element for receiving radiant energy from the input devices, an impedance connected serially with the photoconductive element across which appears an analog summation voltage having at least three discrete levels corresponding to the number of energized input devices, a pair of radiant energy emissive output devices coupled to said impedance for providing binary coded indications corresponding to the levels of the analog summation voltage, and a back-biasing circuit electrically connected to one of the output devices and optically coupled to the other of the output devices whereby at an intermediate level of the analog summation voltage one of the output devices is disabled.

7. An adder circuit comprising a group of individually energizable luminescent input devices, an analog signal generator including a first photoelectric element optically coupled to each of the input devices but electrically isolated therefrom for producing at least three discrete signal levels in accordance with the energization of said input devices, first and second luminescent output devices connected to the analog signal generator, bias circuits individually coupled to the luminescent output devices for energizing said devices at different analog signal levels, and a circuit electrically coupled to the second luminescent output device and optically coupled to the first luminescent device for disabling the second luminescent device when the first luminescent device is energized.

8. A binary adder circuit comprising radiant energy emissive input means, means for controlling the radiant energy emitted therefrom in accordance with binary coded input signals, output means electrically isolated from the input means for providing binary coded indications representative of the addition of the input signals, photoelectric means having at least three conductivity states selectively controllable by the input means, and means for energizing the output means in accordance with the representative conductivity states of said photoelectric means.

9. A binary adder circuit in accordance with claim 8 wherein the last mentioned means includes a back-biasing arrangement for disabling a selected one of the output means when the photoelectric means is in a predetermined one of its conductivity states.

10. A binary adder circuit in accordance with claim 9 wherein the output means comprise radiant energy emissive devices and the back-biasing arrangement includes a second photoelectric means optically coupled to another of the output means.

References Cited in the file of this patent

UNITED STATES PATENTS

| | | |
|---|---|---|
| 2,661,899 | Chromy et al. | Dec. 8, 1953 |
| 2,671,607 | Williams et al. | Mar. 9, 1954 |
| 2,727,683 | Allen et al. | Dec. 20, 1955 |
| 2,869,785 | Adams | Jan. 20, 1959 |

FOREIGN PATENTS

| | | |
|---|---|---|
| 765,326 | Great Britain | Jan. 9, 1957 |